March 18, 1941. A. I. APPLETON Re. 21,751
SIGNAL AND INDICATOR FOR RECORD SHEETS
Original Filed Feb. 26, 1940
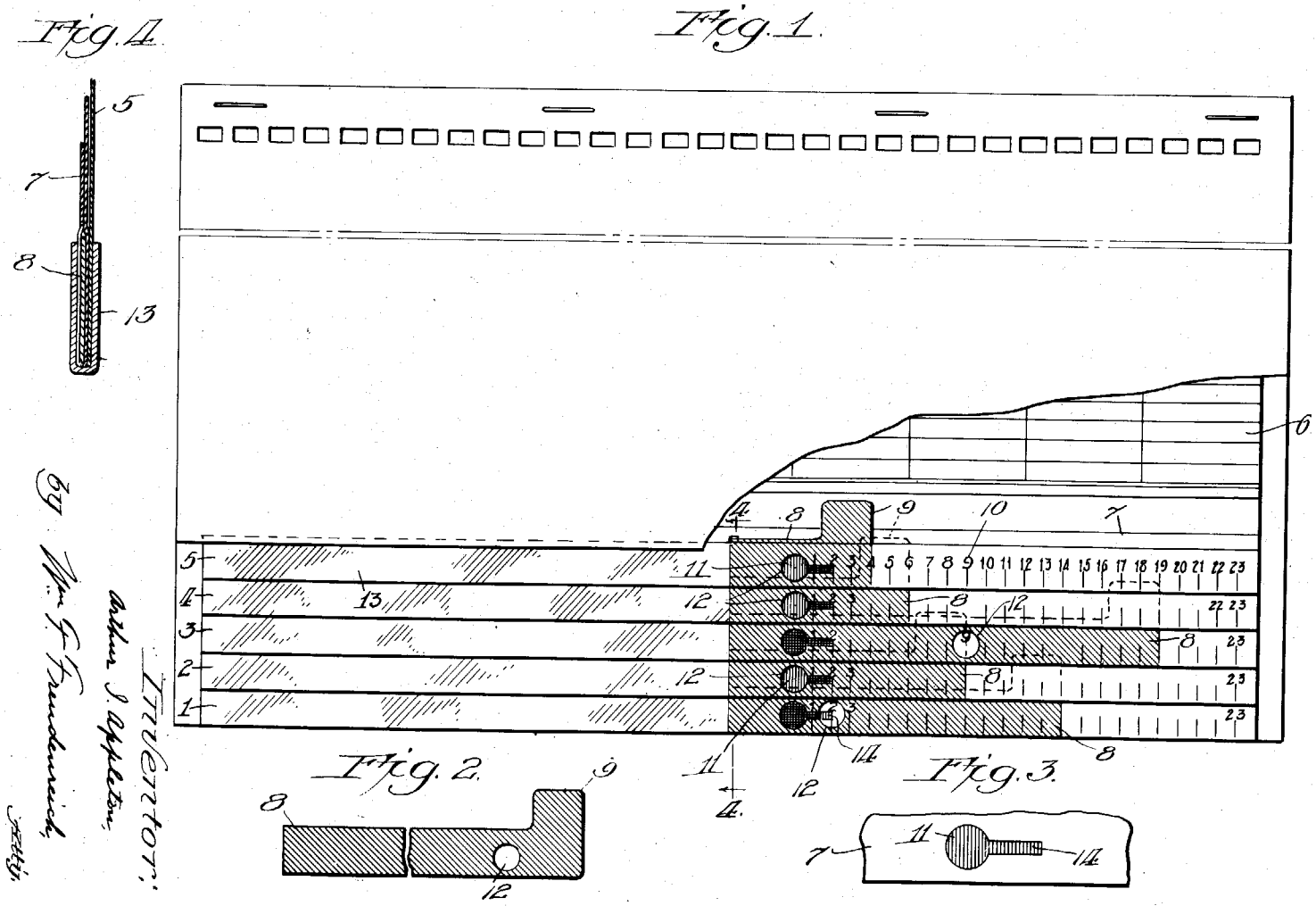
Inventor:
Arthur I. Appleton,
By Wm. F. Freudenreich,
Atty.

Reissued Mar. 18, 1941

Re. 21,751

UNITED STATES PATENT OFFICE 21,751

SIGNAL AND INDICATOR FOR RECORD SHEETS

Arthur I. Appleton, Northbrook, Ill.

Original No. 2,210,746, dated August 6, 1940, Serial No. 320,831, February 26, 1940. Application for reissue December 7, 1940, Serial No. 369,140

7 Claims. (Cl. 129—16.7)

A well known system for keeping records of stocks of goods on hand includes with each record sheet an indicator which shows at a glance how much stock is on hand, in the terms of the number of weeks or other time units required for its consumption; thus providing a ready means for warning the person in charge of keeping up stocks when it is time to order an additional supply. In a large business, where there may be many different items in stock, the time required for filling an order after the placing of the latter may vary greatly. Therefore, the mere fact that the indicator may show that there remains on hand a supply long enough to last a certain number of weeks or months is not, of itself, sufficient to fix the time when a re-order of a given article should be made.

The object of the present invention is to improve the aforesaid indicating means so that in addition to keeping the person in charge informed of the state of the stock with respect to each individual item, it also gives a definite signal when the time has come for re-ordering, regardless of whether it takes a few weeks or perhaps many months to have the order filled.

A further object of the present invention is to improve the old indicating means without making any radical changes in the main structural features whereby it will remain to all intents and purposes substantially the same as the old device while acting as an indicator of quantities of various items in stock or on hand.

For one reason or another it may be undesirable to re-order a great many different items at about the same time instead of spreading the re-orders over a period of some length. A further object of the present invention is to provide means to indicate at any given moment the relation in time of dates when re-orders of all items should be made whereby, if it should happen that an objectionably large number of re-orders fall on the same date, some of those re-orders could be made somewhat earlier and others somewhat later than would normally be the case, and thus secure a distribution of those re-orders.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view, a fragment of the top leaf or cover being partly broken away, of a connected group of records or sheet holders, each equipped with one of my improved indicator and signal devices;

Fig. 2 is a plan view of one of the movable slides forming part of the indicator and signal devices;

Fig. 3 is a plan view, on a somewhat larger scale, of a fragment of the marginal portion of one of the holders, showing the warning marking thereon; and Fig. 4 is a section, on an enlarged scale, on line 4—4 of Fig. 1, the lower marginal portion of only the uppermost sheet holder being shown.

In the drawing there is illustrated a group of leaves or holders for record sheets forming part of a record-keeping and filing system which is being used quite generally and, for the sake of brevity, the detailed description will be confined to this particular use of the present invention.

Referring to the drawing, 1, 2, 3, 4 and 5 represent five flat backs or holders for record sheets, such as indicated at 6. These backs or holders overlie each other so that the lower ends thereof are disposed in shingle-like formation, whereby a narrow marginal portion of each is exposed. In the commercial form of the device, the back or holder has attached thereto, over the entire marginal portion along the lower edge, a strip of tough paper 7 folded along the longitudinal center so as to provide in the loop at the lower end thereof a pocket in which a slide 8 may be positioned. The outer side of this folded portion is cut away for one-half of its length, namely the righthand half, as viewed in Fig. 1. Therefore, when a slide, such as indicated at 8, composed of a long narrow strip of Celluloid or the like and having at one end a laterally-projecting finger piece 9 and of a length slightly greater than one-half the width of a holder, is inserted in a pocket, the slide may be pushed into the pocket until only a small section thereof, at one end protrudes. The lower marginal portion of each holder is bound by means of a U-shaped strip 13 of transparent Celluloid or other suitable material.

On the part 7 of the holder, directly behind the slide, is a row 10 of numbers distributed across almost one-half of the entire width of the holder. As in the case of the devices now in commercial use, the vertical edge at the exposed end of the slide, which continues up to the top of the finger piece, serves as a pointer to cooperate with the row of numbers and may, for example, indicate the quantity of stock of any particular article that is on hand, measured by the number of weeks which will be required for the consumption of such stock. Thus, for example, the slide on the holder 5 may indicate that there is a four weeks' supply, of a given article, on hand; the slide on the holder 4 may show the presence of a six weeks' supply of another article, etc.

In accordance with the present invention, I place on the front face of the rear fold of the strip 7 slightly in advance of each row of numbers a warning marking which may conveniently be a little red disk 11. Each slide is provided with a hole 12 which, in one position of the slide, registers with the red disk which therefore serves as a warning. While the slides may be composed of opaque material, they usually are made of semi-transparent Celluloid. In the drawing the slides are marked or shaded to indicate that they are green. Consequently, except when the hole 12 registers with the red disk, the latter is covered and, in the particular embodiment illustrated, appears simply as a dark spot, as in the case of the lowermost slide and the third slide from the bottom in Fig. 1.

The hole in each slide is spaced just far enough away from the end of the slide that constitutes the pointer to register with the red spot when the pointer registers with that number which indicates the lowest point to which the stock of a given article should reach before re-ordering. Thus, the upper of the five slides illustrated points to the number 4, the second slide points to the number 6, and the third slide points to the number 9, meaning that the article which is recorded on the holder 5 must be re-ordered when the quantity drops down to a four weeks' supply; that a re-order must be made of the article recorded on the holder 4, when the quantity of that article drops to a six weeks' supply; and that the article recorded on the sheet in holder 3 must be re-ordered when there is only a nine weeks' supply left.

It will thus be seen that the slides may be set from time to time to indicate the quantities of various materials that remain in stock and, when it becomes necessary to replenish the stock of any given article, provides unmistakable warning. By providing sets of slides all differing from each other as to the distance of the holes therein from their pointer ends, it is possible not only initially to provide each group of record holders with slides to give the proper warning in the case of each article, regardless of the difference in the length of time required to have orders filled; but if for any reason or other it is found that one must order sooner than was originally anticipated, or that perhaps ordering could be delayed for a substantial time, the slide which was originally inserted in the holder relating to that particular article can be removed and be replaced by another slide having the hole therein differently located.

If it be desired to give a preliminary warning or signal before the hole in a slide reaches the red disk, the disk may be provided with a tail such as indicated at 14, projecting lengthwise past one or two graduations in the scale with which a slide cooperates. Thus, for example, the lowermost slide in Fig. 1 must move past two spaces in the scale before the hole registers with the red disk, but the free end of the tail 14 is already exposed through the hole.

If the center of the hole in the slide is spaced apart from the first graduation a distance equal to the spacings between graduations, the number which happens to be visible through the hole in the slide in any given position of the latter indicates exactly how many weeks or other time intervals must elapse before it is normally necessary to re-order. Thus, in the slide on record holder 3, the numeral 9 is visible through the hole and in the lowermost slide the number 2 registers with the hole. This means that the article of which the record is kept on holder 3 must be re-ordered in nine weeks or other time intervals while the article of which the record is kept on holder 1 requires re-ordering in two weeks or time intervals. By the telltale relative positioning for the graduated scales and the indicating means on the several slides or, in other words, the visibility of the scale numerals through the holes 12, it is possible to ascertain at a glance whether or not the stocks of any one of the corresponding items of goods is "out of step" with the rest of the series. More specifically, if the user makes it an established practice to keep on hand a safe backlog of, say, eight weeks' supply of all items then, under optimum conditions, the numeral 8 should appear in the holes 12 of all of the slides and in such case the holes will, of course, be laterally alined for the entire series of juxtaposed or side-by-side slides. In this connection it should be observed that even when the holes 12 are thus laterally alined the projecting ends of the several slides may be radically out of alinement. This is, of course, for the reason that the delivery time for each of the various items usually differs from the others and, as a consequence, each of the holes 12 is displaced a correspondingly different distance from the end of the slide. Under such circumstances or, in other words, with such difference in delivery time, it is, of course, clear that when the holes 12 are laterally alined the ends of the slides will be out of alinement. So far as the ascertainment of the effective supply on hand is concerned, it is the numeral which shows through the holes which is really significant rather than the positions of the ends of the slides. Hence, by providing the holes, or similar indicia, as previously described, the user is saved from the false impression that he has a substantial equality of stock on hand for all items when the ends of the slides are alined. On the contrary, with the arrangement earlier disclosed, a glance at the series of slides will serve to show whether or not substantially equal value numerals are showing through all of the holes 12. In the event that any one of the slides is so positioned that its hole is substantially out of lateral alinement with the other holes in the series of slides, that gives the user an instant indication that the corresponding item is seriously overstocked or understocked. It will thus be seen that the juxtaposition of the slides, as shown and described, is distinctly advantageous in view of the coordination of the stocking of a whole series of items through the practically instant inspection of the relative slide positions to determine the lateral alinement of the indicia or holes 12.

While I have illustrated and described with particularity only a single preferred form of my invention I do not desire to be limited to the exact structural details thus illustrated and described; but intend to cover all forms and arrangements which come within the definitions of my invention constituting the appended claims.

I claim as my invention:

1. A combined quantity indicator and warning device for use in connection with the keeping of records of stocks of goods, comprising a stationary element and a longitudinally-movable slide mounted on said element, said element having a line of graduations extending along the slide for cooperation with the slide to indicate quantities of stock on hand, said element also having underneath the slide at one end of the graduations a warning mark, and said slide having therein a hole that registers with the said warning mark whenever the slide is in a position indicating that the quantity of stock has been reduced to any predetermined amount.

2. A combined quantity indicator and warning device for use in connection with the keeping of records of stocks of goods, comprising a stationary element and a longitudinally-movable slide mounted on said element, said element having a line of graduations extending along the slide for cooperation with a pointer on the slide to indicate quantities of stock on hand, said element also having underneath the slide at one end of the graduations a warning mark, and said slide having therein a hole that registers with the said warning mark in a given position of the slide; the distance between said hole and the pointer on the slide being determined by the minimum quantity of goods that must still be in stock at the time a warning signal is desired.

3. A combined indicator and warning device for use in connection with the keeping of records of stocks of goods, comprising a stationary element and a longitudinally-movable slide mounted on said element, said element having a line of graduations extending along the slide for cooperation with a pointer on the slide to indicate quantities of stock on hand, said element also having underneath the slide at one end of the graduations a warning mark, and said slide having therein a hole that registers with the said warning mark in a given position of the slide and through which the graduations may be seen one at a time as the slide is moved, the distance between said hole and the pointer on the slide being determined by the minimum quantity of goods that must still be in stock at the time a warning signal is desired.

4. A combined indicator and warning device for use in connection with the keeping of records of stocks of goods, comprising a stationary element and a longitudinally-movable slide mounted on said element, said element having a line of graduations representing time intervals extending along the slide for cooperation with the slide, a pointer on the slide for cooperation with said graduations, said element also having underneath the slide at the beginning of the graduations a warning mark, and said slide having therein a hole that registers with the said warning mark whenever the pointer registers with any predetermined graduation.

5. A combined quantity indicator and warning device for use in connection with the keeping of records of stocks of goods, comprising a stationary element and a longitudinally-movable slide mounted on said element, said element having a line of graduations extending along the slide for cooperation with a pointer on the slide to indicate quantities of stock on hand in terms of the number of units of time required for consumption of the stock, said element also having underneath the slide near the beginning of the graduations a warning mark, and said slide having therein a hole that registers with the said warning mark whenever the slide is in a position indicating that the stock will be consumed in any predetermined number of time units; whereby, by providing a plurality of slides having holes positioned at different points therein, a warning position may be given when any desired number of time units must elapse before a stock of goods is exhausted.

6. The combination with a plurality of sheets for keeping stock records, of a lengthwise-movable slide mounted on the corresponding margin of each sheet parallel to an edge, each of said margins having thereon a line of graduations arranged lengthwise of and underneath the corresponding slide, an end of each slide serving as a pointer cooperating with the adjacent graduations, each slide having therein a hole adapted to register with one after another of said graduations as the slide is moved, each hole being spaced from the aforesaid end of its slide a distance corresponding to any desired number of graduations which may vary for the different slides, and a warning mark on each sheet in position to be exposed through the hole in the corresponding slide when the pointer end of the latter registers with the graduation that is the aforesaid number of graduations from the beginning of the adjacent line of graduations.

7. The combination with a plurality of superimposed sheets for keeping stock records disposed with their corresponding marginal portions at one side thereof in terraced relation, of lengthwise-movable slides mounted in side-by-side relation on said marginal portions of corresponding ones of the sheets, the terraced relation of said marginal portions exposing to view the slides on the underlying sheets in the series, each of said sheets having indicia thereon including a line of graduations adjacent to and extending along the path of its slide, and each of said slides having a first indicator on it adapted to register with the graduations to indicate the total supply of stock on hand and a second indicator thereon registrable with the indicia on the corresponding sheet and located a predetermined distance from the first indicator, said predetermined distance being determined by the minimum quantity of goods that must still be in stock at the time a warning signal is desired to indicate when reordering is requisite, the lateral alinement, or lack of it, of said second indicators on the several side-by-side slides in the series serving to afford an indication of the coordination of the effective stocks on hand for the several corresponding items of goods.

ARTHUR I. APPLETON.